US006720990B1

United States Patent
Walker et al.

(10) Patent No.: US 6,720,990 B1
(45) Date of Patent: Apr. 13, 2004

(54) INTERNET SURVEILLANCE SYSTEM AND METHOD

(75) Inventors: Jay S. Walker, Ridgefield, CT (US); Daniel E. Tedesco, New Canaan, CT (US); Dean P. Alderucci, Ridgefield, CT (US); Magdalena Mik, Greenwich, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/221,250

(22) Filed: Dec. 28, 1998

(51) Int. Cl.$^7$ ................................................. H04N 7/18
(52) U.S. Cl. ...................... 348/143; 348/153; 348/154; 725/105
(58) Field of Search .................. 725/105; 348/143–160, 348/4–15

(56) References Cited

U.S. PATENT DOCUMENTS

| | | |
|---|---|---|
| 4,458,266 A | 7/1984 | Mahoney |
| 4,511,886 A | 4/1985 | Rodriguez |
| 4,622,538 A | 11/1986 | Whynacht et al. |
| 4,646,145 A | 2/1987 | Percy et al. |
| 4,861,154 A | 8/1989 | Sherwin |
| 4,955,388 A | 9/1990 | Silberstein |
| 4,982,346 A | 1/1991 | Girouard et al. ............ 364/550 |
| 5,034,807 A | 7/1991 | Von Kohorn |
| 5,247,433 A | 9/1993 | Kitaura et al. |

(List continued on next page.)

FOREIGN PATENT DOCUMENTS

| | | |
|---|---|---|
| JP | 11053669 | 2/1999 |
| WO | WO 97/22074 | 6/1997 |

OTHER PUBLICATIONS

Carolyn Connerat, "Business Television In The Digital Age; Special Section: Business TV", Satellite Communications, Feb., 1995, vol. 19; No. 2; at p. 39; IIS: 0147–7439.

The Associated Press, "Court Rejects Killer's Appeal In Genovese Case", The New York Times, Dec. 26, 1996, Thursday, Late Edition—Final, Section B; p. 7; Col. 1; Metropolitan Desk.

(List continued on next page.)

*Primary Examiner*—Andy Rao
(74) *Attorney, Agent, or Firm*—Magdalena M. Fincham

(57) ABSTRACT

A system and method are disclosed for a central server to manage remote monitoring tasks performed by users of a data network. An exemplary method comprises: receiving a request from a user of a user device to monitor a remote location; determining a remote location to be monitored; enabling communication between a sensor at the remote location and the user device; and crediting value to the user in accordance with an amount of time the user device has been in communication with the remote sensor for remote monitoring purposes. An alternate exemplary method includes measuring user attentiveness while the user device is in communication with the remote sensor. Thus, the disclosed system and method provide a way for users of a data network such as the Internet to log on at any time and perform remote monitoring tasks for value. Idle time can now be turned into value using the disclosed system and method. Moreover, little or no skill is required of the user to earn value using the disclosed system and method; the user need only be attentive while performing a remote monitoring task. Location owners also benefit from the convenience by which they can now have their properties monitored and by the ability of the disclosed system and method to ensure the attentiveness of the user performing the remote monitoring task.

44 Claims, 10 Drawing Sheets

U.S. PATENT DOCUMENTS

| | | | |
|---|---|---|---|
| 5,412,708 A | 5/1995 | Katz .......................... 348/14 | |
| 5,519,669 A | 5/1996 | Ross et al. | |
| 5,550,581 A | 8/1996 | Shou | |
| 5,571,057 A | 11/1996 | Ayers | |
| 5,598,456 A | 1/1997 | Feinberg | |
| 5,708,655 A | 1/1998 | Toth et al. | |
| 5,759,101 A | * 6/1998 | Von Kohorn ................ 463/40 | |
| 5,762,611 A | 6/1998 | Lewis et al. | |
| 5,786,746 A | 7/1998 | Lombardo et al. | |
| 5,790,174 A | 8/1998 | Richard, III et al. | |
| 5,794,210 A | 8/1998 | Goldhaber et al. | |
| 5,857,190 A | * 1/1999 | Brown ........................ 707/10 | |
| 5,909,548 A | * 6/1999 | Klein et al. ............ 395/200.47 | |
| 6,166,729 A | * 12/2000 | Acosta et al. ............... 345/327 | |
| 6,271,752 B1 | * 8/2001 | Vaios ......................... 340/541 | |
| 6,297,825 B1 | * 10/2001 | Madden et al. ............. 345/619 | |
| 6,476,858 B1 | * 11/2002 | Ramirez Diaz et al. .... 348/159 | |
| 6,538,689 B1 | * 3/2003 | Chang ........................ 348/159 | |

OTHER PUBLICATIONS

Patrick O'Driscoll, "Bystanders' SILence Resounds Denver Shocked By Failure to Call Police During Murder", USA Today, Mar. 31, 1998, Tuesday, First Edition, News Section at p. 3A.

Corinna Wu, "Private Eyes Biometric Identification Is Set To Replace Passwords And PINS", Science News, vol. 153, Apr. 4, 1998.

Michael Dorman, "Long Island: Our Story/The Killing of Kitty Genovese/Her Public Staying In Queens Becomes A Symbol Of Americans Failure To Get Involved", Newsday (New York, NY), Jun. 10, 1998, Wednesday, Nassau and Suffolk Edition, News Section p. A19.

"Smile, You're On The Web!", RePlay Magazine, Jun., 1998 at p. 48.

Lee Anderson, "Good Samaritanism Here", Chattanooga Free Press, Jul. 3, 1998, Editorial Section at p. A6.

"Remote Video Monitoring Software by PriVID Eye", PriVID Eye Systems Corporation, (http://www.privid-eye.com/index.html), download date: Aug. 5, 1998.

"Spies: Surveillance, Security, Wiretaps, Prot . . . ", CCS International, Inc. (http://www.spyzone.com/CCSSL1.html), download date: Apr. 5, 1998.

"SpyZone.Com:CCS Group:Company Profile", CCS International, Inc. (http://www.spyzone.com/CCSSZ1.html), download date: Aug. 5, 1998.

"Remote Video Surveillance With a High-tech, PC-cam Adapter!", NOVEX Invest Ltd., (http://www.novexcanada.com/), download date: Aug. 5, 1998.

"What is NOVEX Video Catcher Plus? (NOVEX VC+)", NOVEX Invest Ltd., (http://www.tradezone.com/tradesites/novex.html), download date: Aug. 5, 1998.

James E. Gaskin, "Cyberspace Goes Blue-collar", Inter@ctive Week, Aug. 19, 1998.

"Fortune: 7.20.98 The Bill and Warren Show: In . . . ", Fortune Magazine, (http://www.pathfinder.com/fortune/1998/980721/bil.html), download date: Sep. 21, 1998.

PCT International Search Report for Application No. PCT/US99/29659, dated Apr. 17, 2001.

* cited by examiner

← 230

| USER IDENTIFIER 410 | USER RATING 420 | ACCOUNT BALANCE 430 |
|---|---|---|
| BSMITH | 0 | - $39.95 |
| SJOHNSON | 8 | + $498.60 |
| RMARTIN | 7 | + $192.55 |

FIG. 4

| TASK IDENTIFIER 505 | SENSOR LOCATIONS 510 | SENSOR ADDRESS 515 | LOCATION OWNER 520 | PAY RATE 525 | RULE(S) 530 | SHIFT(S) 535 | EMERGENCY PROCEDURES 540 | FULLY ASSIGNED? 545 |
|---|---|---|---|---|---|---|---|---|
| 12345 | FLEET BANK, HAMDEN, CT BRANCH | WWW.FLEETBANK.COM/ BRANCH3/CAM1 | FLEET CORPORATION, HARTFORD, CT | $5.00/ HOUR | 3 USERS | 1/1/98 12:00 AM - 3:00 AM | CLICK EMERGENCY BUTTON ON ISP FRAME | YES |
|  |  |  |  |  | UP TO 2 USERS | 1/1/98 3:01 AM - 6:00 AM |  | NO |
| 12346 | 17 MAIN ST. ANYTOWN, CT 06999 | (203) 555-1212 | BOB OSBORNE | $4.50/ HOUR | USER RATING > 6 | 1/2/98 9:00 AM - 5:00 PM | CALL ANYTOWN POLICE DEPT. AT (203) 981-3987 | NO |

| TASK IDENTIFIER 605 | SHIFT 610 | USER IDENTIFIER(S) 615 | STATUS 620 | PERFORMANCE RESULTS 625 |
|---|---|---|---|---|
| 12345 | 1/1/98 12:00 AM - 3:00 AM | RMARTIN SGAVIN DBYRD | COMPLETED | - ALL TEST COMMUNICATIONS POSITIVE<br>- NO EMERGENCIES |
| 12345 | 1/1/98 3:01 AM - 6:00 AM | SJOHNSON | IN PROGRESS | - FAILURE TO RESPOND TO TWO TEST COMMUNICATIONS |
| 12346 | 1/2/98 9:00 AM - 5:00 PM | RMARTIN | N/A | N/A |

FIG. 6

| TASK IDENTIFIER 705 | TEST COMMUNICATION 710 | TEST COMMUNICATION INTERVALS 715 | REQUIRED RESPONSE TIME 720 | REQUIRED RESPONSE 725 |
|---|---|---|---|---|
| 12345 | C://TESTCOM/12345/CLIP1 ("STAGED EMERGENCY") | RANDOM | 10 SECONDS | CLICK 911 BUTTON |
| 12346 | C://TESTCOM/12346/QUESTIONSET1 ("QUESTIONS") | EVERY 5 MINUTES | 15 SECONDS | CORRECT ANSWER CHOICE |

INTERNET SURVEILLANCE SYSTEM AND METHOD

TECHNICAL FIELD

This invention relates generally to a commerce-based system and method, and in particular, to a system and method for a central server to manage remote monitoring tasks performed by users of a data network such as the Internet.

BACKGROUND

Video surveillance has grown to play an important part in security. Video cameras have been employed in numerous locations to monitor and deter certain undesirable behavior.

Video cameras are currently used to monitor locations in the absence of humans. ATMs, banks, and convenience stores are typically equipped with video cameras that constantly record video signals for later viewing. Thus, in the event of an emergency such as a robbery, the recorded signal can be reviewed at a later time to help identify the perpetrators of the crime. However, these systems are primarily useful for identifying criminals after the crime has been committed. The only way these systems can prevent crime is by the deterrence that results from the presence of the camera. That is, an unscrupulous party would be more hesitant to commit a crime if they saw a video camera.

Video cameras have also been employed to assist humans in monitoring locations. Retail stores have used video cameras so that store managers and security guards can view customer behavior in an effort to curtail shop-lifting. Furthermore, security guards in offices and apartment buildings use video cameras to view several locations simultaneously. For example, a security guard may view hallways, parking lots and elevators while sitting at a front desk.

While video cameras that automatically record activity for later review are not particularly useful in preventing crime, video cameras that assist humans in the monitoring process suffer their own shortcomings. For example, proprietary systems such as closed-circuit television systems can only be used by employed security guards. And because only a limited number of security guards can feasibly view the video feeds from these closed-circuit television systems, there are more errors in the detection of emergencies. In order to effectively monitor all areas of an establishment at all times, the owner would need to employ a substantial number of security guards, which would be prohibitively costly. Moreover, prior art video security systems do not enable managers and employers to test for a security guard's attentiveness. Thus, a security guard could be sleeping while supposedly "watching" the monitor.

The widespread adoption of the Internet as a tool for remote communication has also given rise to the development of video and image-based remote security systems. For example, PriVID Eye Systems Corporation is a Florida-based development firm specializing in advanced remote video monitoring technologies. Their "RemoteVision MX" is a software "video capture card" package that enables a user to view remote locations through their PC over a telephone line. Similarly, Novex Canada's "Video Catcher Plus" ("VC+") is a home security package that includes software, 4 alarms, 4 video cameras and a small device that plugs into the serial port of a home PC. The video cameras and the alarms are connected to the computer through the device. A user of the VC+ can connect to their PC from a remote computer through a conventional modem/PSTN connection to view video feeds. The VC+ allows for viewing of up to 4 videos on one screen simultaneously. Also, the VC+ is enabled with motion detection such that recording can be automatically started only if and when a motion is detected.

Companies such as Cannondale have recently employed a web-based system enabling managers to view production work as described by James E. Gaskin, "Cyberspace Goes Blue-collar", Inter@ctive Week, Aug. 19, 1998. As discussed in the Gaskin article, Weyer Haeuser not only uses web-based remote cameras to view the production floor, but has supplemented remote monitoring using net-cams to view dials and meters of production equipment. However, these web-based systems suffer from the same shortcomings as closed-circuit television systems. In particular, there currently is no way for a property owner to effectively monitor his premises without prohibitively escalating his costs or to test the attentiveness of those monitoring his premises.

SUMMARY OF INVENTION

The problems identified above are solved and a technical advance is achieved in the art by providing, in accordance with the present invention, a system and method for a central server to manage remote monitoring tasks.

A method for a central server to manage remote monitoring tasks according to one embodiment of the present invention includes: receiving a request from a user of a user device to monitor a remote location; determining a remote location to be monitored; enabling communication between a sensor at the remote location and the user device; and crediting value to the user for monitoring the remote location in accordance with an amount of time the user device has been in communication with the sensor for remote monitoring purposes.

A method according to an alternate embodiment of the present invention includes: receiving a request from a user of a user device to monitor a remote location in exchange for value; determining a remote location to be monitored; enabling communication between a sensor at the remote location and the user device; and measuring user attentiveness while the user device is in communication with the sensor. Many other advantageous embodiments are also disclosed.

Thus, one embodiment of the present invention is directed to a commerce-based system and method that enables members of the general public who have access to a data network such as the Internet to log on at any time and perform remote monitoring tasks for value. In accordance with one aspect of the present invention, a user account is credited with value in accordance with the amount of time a user spends monitoring remote locations. Moreover, little or no skill is required of the user short of his remaining attentive during a remote monitoring session. Thus, the idle time of unskilled workers, as well as the underutilized idle time of even highly skilled workers, can now be turned into value in accordance with the present invention.

An alternate embodiment measures user attentiveness. In one such embodiment, an inattentive user is penalized by automatically replacing him with another user and preventing him from participating in remote monitoring tasks in the future. Thus, location owners can rest assured that their properties are being diligently monitored while they are away without having to incur excessive costs associated with hiring security guards (e.g., providing them with uniforms, benefits, etc.).

Another aspect of the present invention includes taking precautions to maintain anonymity of the locations being monitored. Anonymity is advantageous because the present invention allows individuals who are not guaranteed to be trustworthy to monitor private property over a public network (e.g., rather than requiring any pre-screening of users, one embodiment of the present invention simply relies upon user attentiveness to determine whether a user will be permitted to continue to participate in remote monitoring tasks). Without taking precautions to maintain anonymity, an unscrupulous individual knowing the location's identity could study its characteristics to plan a crime. Thus, in one embodiment of the present invention, users are not provided with the identity of the remote location being monitored and, indeed, affirmative measures are taken to prevent the user from ascertaining the identity of the location.

Further aspects of the present invention will become apparent during the course of the following description and by reference to the attached drawings.

BRIEF DESCRIPTION OF THE DRAWINGS

FIG. 4 illustrates an exemplary user database.

FIG. 5 illustrates an exemplary task database.

FIG. 6 illustrates an exemplary session status database.

FIG. 7 illustrates an exemplary database of user performance testing rules.

DETAILED DESCRIPTION

Figure 1:
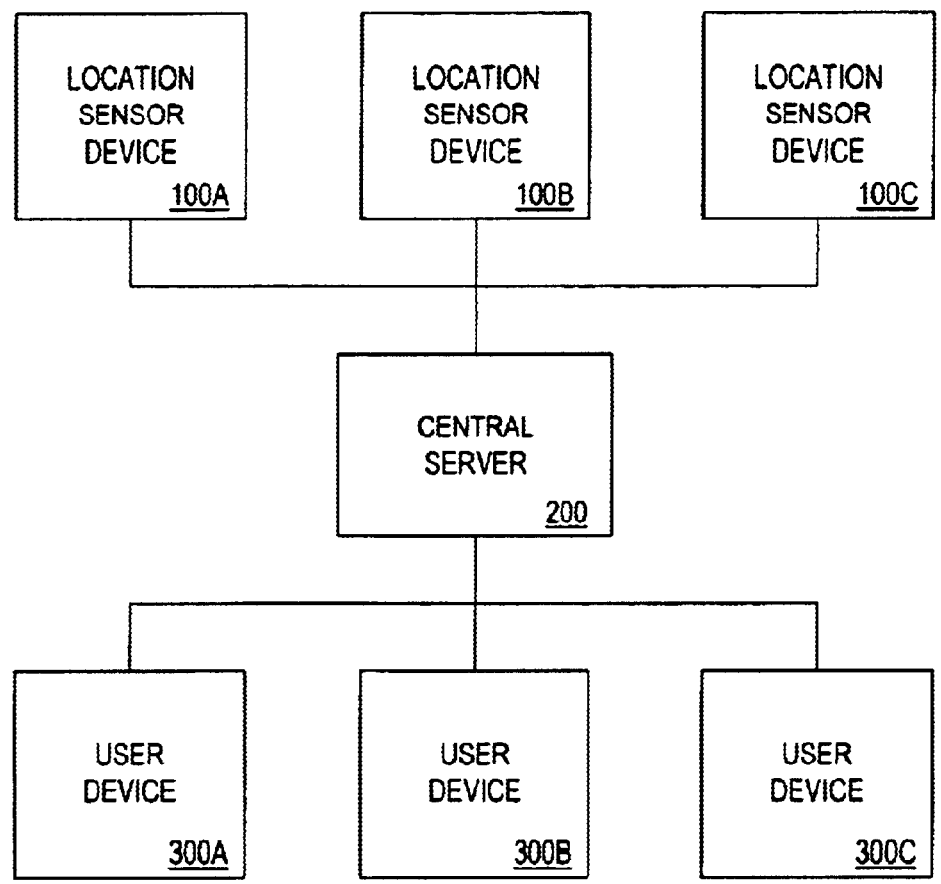
FIG. 1 is a block diagram illustrating one embodiment of the system of the present invention.

Referring now to the drawings, wherein like reference numerals refer to like parts, FIG. 1 illustrates one embodiment of the present invention wherein users of a data network such as the Internet can "log on" to a web site and monitor one or more remote locations in exchange for value.

As shown in FIG. 1, a central server 200 is coupled to a plurality of remote location sensor devices 100a–c and a plurality of user devices 300a–c. Central server 200 may be a high bandwidth web server of the type commonly operated by Internet service providers. User devices 300a–c may be personal computers and/or televisions coupled to the Internet (e.g., WebTV). Location sensor devices 100a–c may comprise digital/analog video cameras, digital/analog audio microphones, motion detectors, pressure sensors, thermal sensors, laser and/or light sensors, radar, sonar and other sensing devices well known to those skilled in the art. It is to be understood that any number of user devices and sensor devices may be coupled to the central server 200.

In one embodiment of the present invention, the central server 200 may be operated and maintained by an Internet service provider (ISP), such as America Online™. The ISP receives payment from entities (e.g., banks, retail stores, private home owners, etc.) desiring their locations to be monitored by one or more of the ISP's users. For example, Fleet Bank may offer to pay the ISP $6.00 per hour to have a user monitor a Fleet branch remotely over the Internet. The ISP in turn advertises this opportunity to its users at the stated rate (i.e., $6.00 per hour) less a service fee (e.g., 25% of the quoted rate of $6.00 per hour). After a user has logged on and completed the remote monitoring task, the ISP bills Fleet Bank at the stated rate and pays or credits the user for their time at the stated rate less the service fee.

To monitor remote locations for value, users initially register with the central server 200 and receive a user identifier. After registering, users can simply present their user identifier to central server 200 when logging on for assignment of a remote monitoring task. Remote monitoring tasks include a task identifier and a shift (e.g., a date and/or a time period). Central server 200 assigns the remote monitoring task taking into account predetermined rules specified by the location owner, such as a predetermined number of users required to monitor the remote location simultaneously and/or a minimum user rating. In accordance with one aspect of the present invention, users are rated based on their attentiveness during monitoring sessions, as will be discussed in detail hereinafter in connection with FIG. 8.

In addition, a number of precautions are preferably taken by central server 200 to maintain anonymity of the location being monitored. Anonymity is typically advantageous since the present invention allows individuals who are not guaranteed to be trustworthy to monitor private property over a public network. These precautions are discussed in detail hereinafter in connection with FIG. 8 and include preventing the user from monitoring a location that is within a predetermined distance of the user's home address. At a minimum, the identity of the physical location assigned for monitoring is not revealed to the user. In the prior art remote video surveillance systems discussed above, anonymity was not important, or even practical, because those systems were designed for private usage.

At the start of the shift, central server 200, enables communication between the location sensor devices 100a–c and the user devices 300a–c. As previously indicated, a location may be monitored by a plurality of users simultaneously. During the shift, central server 200 takes steps to measure, encourage and/or enforce user attentiveness, as will be discussed in detail hereinafter in connection with FIG. 8. One method of measuring user attentiveness includes transmitting test communications to the user device and receiving responses to the test communications within a predetermined period of time. If a predetermined number of responses to test communications are not received within the time specified, the user's rating is lowered and communication between the location sensor device(s) and the user device may consequently be disabled. In addition to lowering the user's rating, the user can be further penalized as discussed in detail hereinafter in connection with FIG. 8, including preventing future monitoring by the user. However, if communication between the user device and the remote sensor device(s) has not been disabled due to inattentiveness, at the end of the shift, central server 200 credits value to the user's account for performing the monitoring task as will be discussed in detail hereinafter.

At the time a user is assigned the remote monitoring task, he is also provided with emergency procedures to be followed in the event that the user detects an emergency at the remote location during his shift. If a signal is received by the user device from the central server 200 and the user interprets that signal to indicate an emergency at the remote location, central server 200 will determine whether the reported emergency is legitimate in the manner discussed in detail hereinafter in connection with FIG. 8. If legitimate, central server 200 will transmit an output request to an emergency dispatch service corresponding to the sensor location. Alternatively, the emergency procedure provided to the user includes the phone number of the emergency dispatch service (i.e., a service geographically corresponding to the remote location) and thus, upon detection of an emergency, the user can contact the emergency dispatch service himself.

Figure 2:
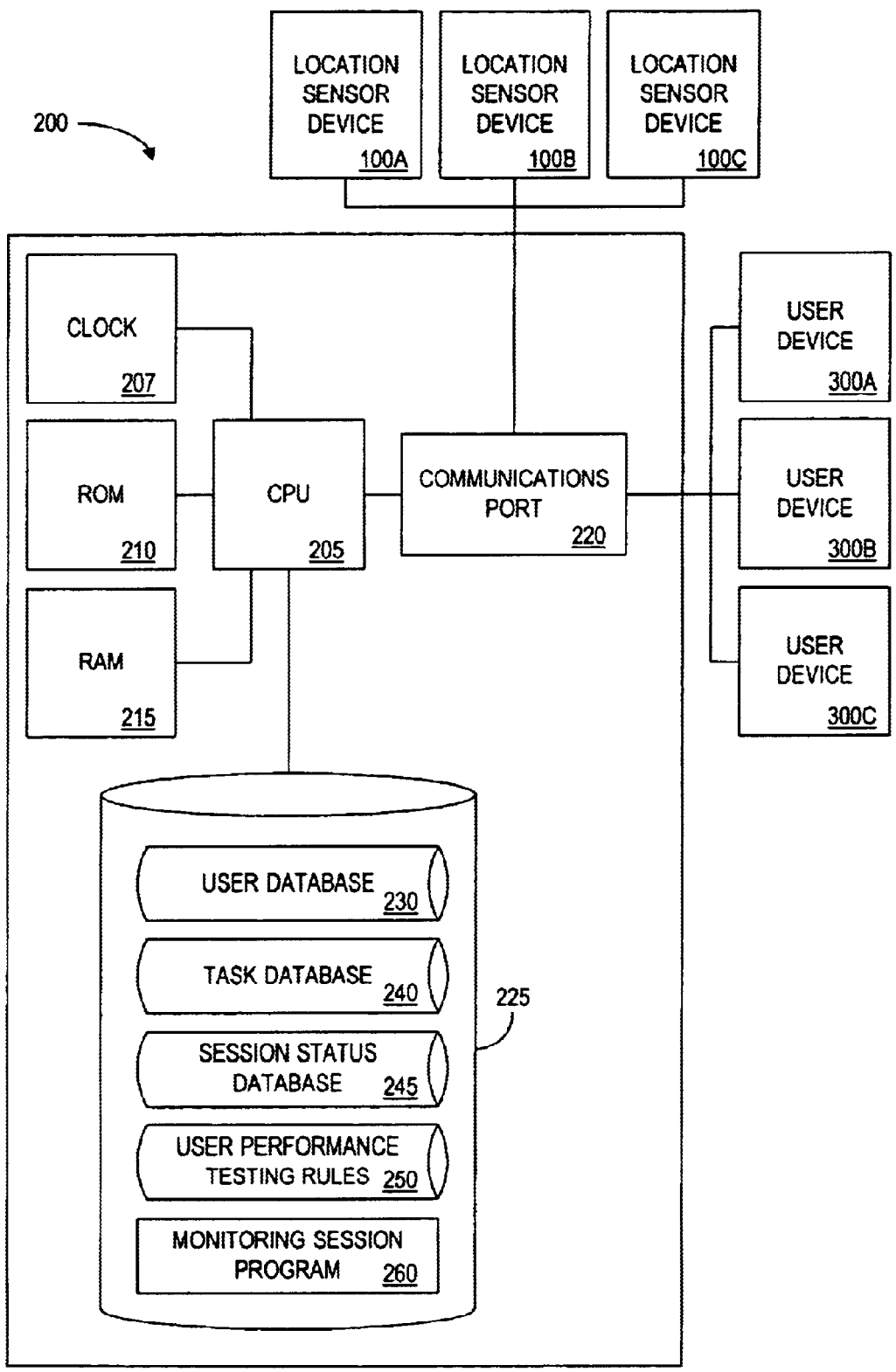
FIG. 2 is a block diagram illustrating one embodiment of the central server of the present invention.

FIG. 2 depicts a block diagram of an exemplary central server 200 maintained and operated, e.g., by an Internet service provider. The central server 200 performs all the operations of a conventional server maintained and operated by an Internet service provider and performs additional operations in accordance with the present invention. The central server 200 includes a CPU 205 coupled to a ROM 210, RAM 215 and system clock 207. The CPU 205 is also coupled to the location sensor devices 100a–c and the user devices 300a–c via a communications port 220. As shown in FIG. 2, the CPU 205 is also coupled to a data storage device 225. Of course, CPU 205 may comprise a plurality of processors working in conjunction.

Data storage device 225 includes a variety of databases including a user database 230, a task database 240, a session status database 245, and a user performance testing rules database 250. The user database 230 of data storage device 225 contains user information. The task database 240 contains information concerning remote monitoring tasks. The session status database 245 contains information concerning the status of remote monitoring tasks. The user performance testing rules database 250 contains testing rules for remote monitoring tasks. Each of these databases will be discussed in detail hereinafter in conjunction with FIGS. 4–7. Storage device 225 further includes a monitoring session program 260 executed by CPU 205 to manage remote monitoring tasks in accordance with the present invention. The monitoring session program 260 will be discussed in detail hereinafter in connection with FIGS. 8 and 9.

Figure 3:
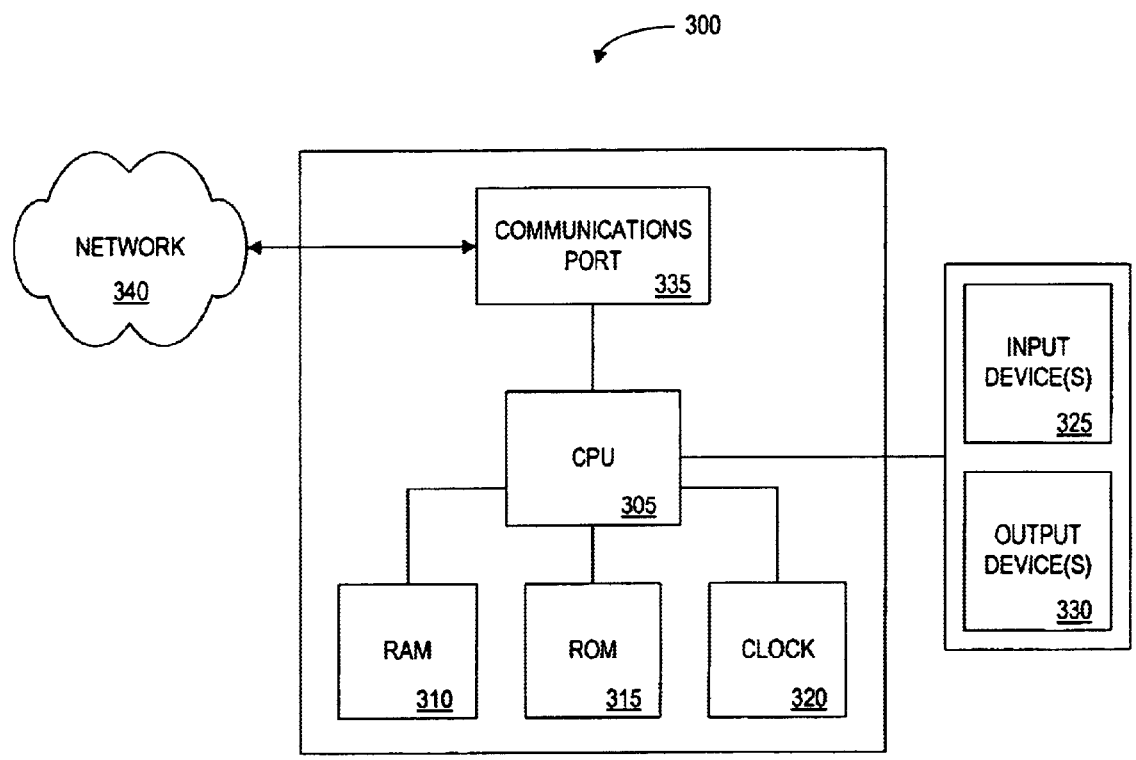
FIG. 3 is a block diagram illustrating an exemplary user device.

FIG. 3 is a block diagram illustrating an exemplary user device 300. In one embodiment, the user device can be a personal computer, which includes a CPU 305 coupled to ROM 310, RAM 315 and system clock 320. The CPU 305 is coupled to a variety of input devices 325 and output devices 330. The input devices 325 may include one or more of the following: a mouse, a keyboard, a monitor with "touch screen" capability, and a microphone. The output devices 330 may include, for example, a monitor and/or a speaker. The device 300 also includes a communications port 335 for accessing a data network 340 such as the Internet.

FIG. 4 illustrates an exemplary user database 230, which records information concerning users who have registered to log on to the central server of the present invention to monitor remote locations in exchange for value. As previously indicated, when a user first requests to monitor a remote location, a record for the user is established in the user database 230. For each record, the user database 230 includes a user identifier field 410, a user rating field 420, and an account balance field 430.

The user identifier field 410 of user database 230 contains a user identifier such as a password, a PIN number, a credit card number, or a telephone number provided by the user, or some other identifier assigned to the user by the central server 200. The user rating field 420 contains a user rating generated by central server 200 based on the user's past performance during remote monitoring sessions. Lastly, account balance field 430 is a running account (e.g., a financial account) of the value credited to the user in exchange for performing remote monitoring tasks.

FIG. 5 illustrates an exemplary task database 240 which preferably stores specific information for each remote monitoring task. When a location owner instructs the operator of server 200 (e.g., an ISP) to have its location monitored remotely by one of the ISP's users, a record for the remote monitoring task is established in the task database 240 in accordance with information provided to the ISP by the location owner. For each record, the task database includes a task identifier in field 505 (assigned by the ISP), the geographic location of the remote sensor in field 510 (e.g., Fleet Bank, Hamden, CT Branch), the electronic address of the remote sensor in field 515 (e.g., www.fleetbank.com/branch3/cam1), and the owner of the location in field 520 (e.g. Fleet Corporation, Hartford, Conn.). Each record also includes the pay rate associated with monitoring the location in field 525, any rules that must be satisfied prior to monitoring the location in field 530 (e.g., more than 3 users), the shift(s) during which the location is to be remotely monitored in field 535 and the emergency procedures to be followed in the event that the user detects an emergency condition at the remote location in field 540 (e.g., click the emergency button on the ISP frame). Lastly, each record also contains an indication in field 545 of the availability of the remote monitoring task (i.e., whether or not user(s) are still needed to perform the task).

FIG. 6 illustrates an exemplary session status database 245, which maintains status information for each shift of a remote monitoring task. For each task and shift identified by the task identifier in field 605 and shift in field 610, the session status database 245 includes the user identifier(s) in field 615 (as indicated above, more than one user may monitor the same location), the status of the shift in field 620, and the performance results of the user(s) in responding to test communications in field 625. As shown in FIG. 6, if the shift of the remote monitoring task has not yet commenced, the entries in fields 620 ("Status") and 625 ("Performance Results") will contain the indication "Not Available" ("N/A").

FIG. 7 illustrates an exemplary user performance testing rules database 250. The user performance testing rules database 250 includes a plurality of records each associated with the user testing rules for a particular task. Each record includes fields for a task identifier in field 705, a test communication in field 710, test communication intervals in field 715, the required response time in field 720, and the required response in field 725.

The test communication field 710 in database 250 contains the test communication to be transmitted to the user during the remote monitoring task (e.g., staged emergencies, questions, etc.). Field 715 contains the frequency at which the test communication is to be transmitted to the user (e.g., random, periodic, etc.). Field 720 contains the time in which the user is required to respond to the test communication (e.g., 10 seconds). Lastly, field 725 contains the required user response to the test communication (e.g., click 911 button).

Figure 8A:
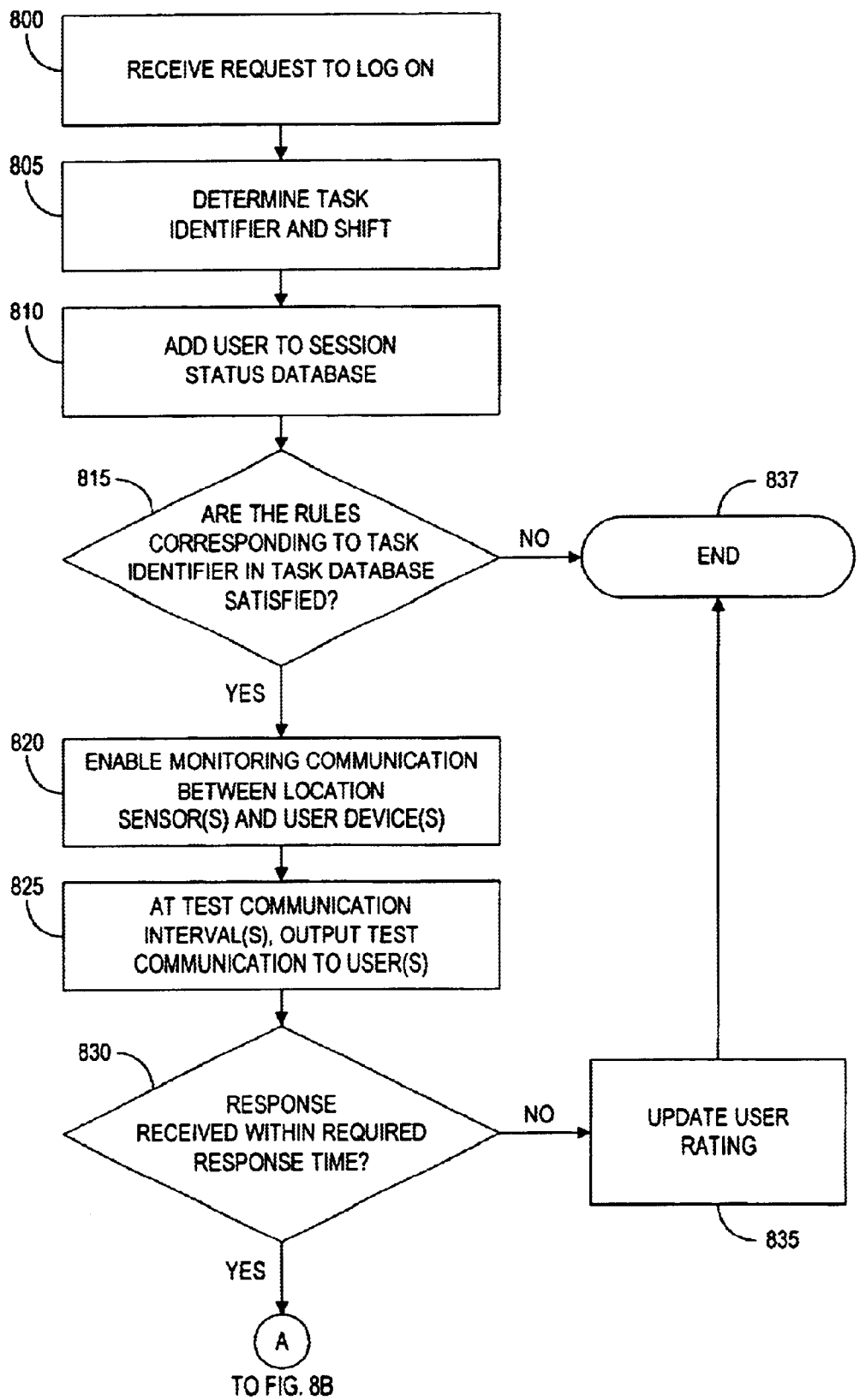
FIGS. 8A and 8B are flow-charts illustrating an exemplary process of the monitoring session program executed by the central server of the present invention.
Figure 8B:
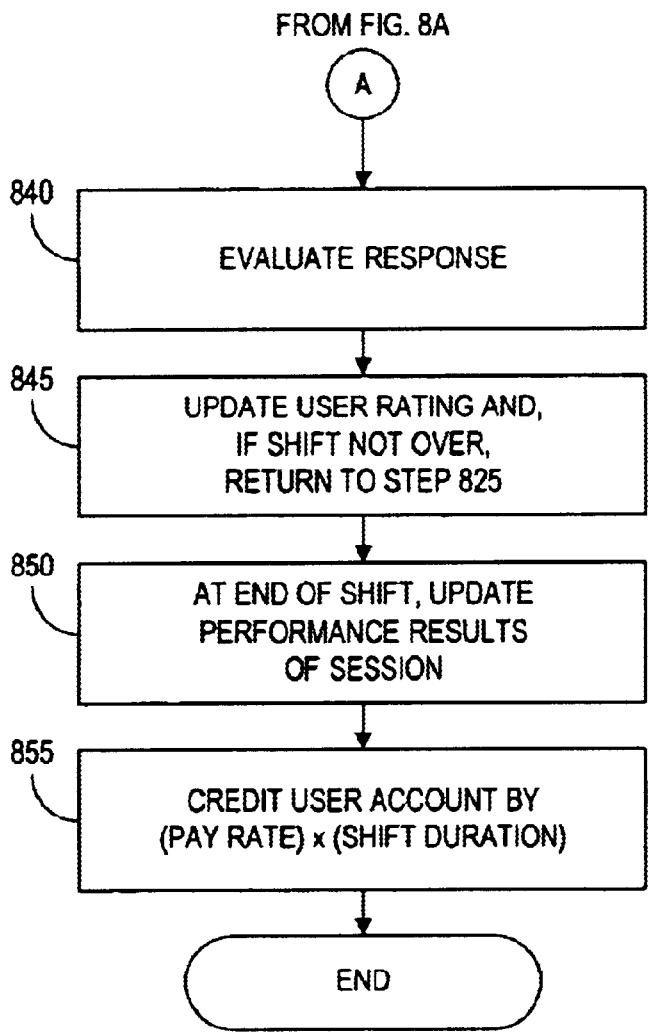

FIGS. 8A and 8B are flow-charts illustrating an exemplary process of the monitoring session program 260 executed by central server 200. Users preferably "register" with the operator of the central server 200 to perform remote monitoring tasks. Registration may take place on-line, by phone, by mail, or in-person. At the time of registration, central server 200 assigns the user a user identifier (if one is not supplied by the user) and then creates a record for the user in user database 230 (if one has not already been created). As shown in FIG. 4, the record will contain the user identifier in field 410. However, the user rating in field 420 will contain a "Not Available" entry or the like and the account balance in field 430 will be "$0.00" if the user has not yet performed a remote monitoring task. If registration occurs on-line, the user may either remain on-line for assignment of a remote monitoring task, or log off and then log back on at a later time to request an assignment.

Turning to FIG. 8A, in step 800, central server 200 receives a request from a user of the data network to monitor a remote location. The request may include the user identifier previously assigned to the user. In step 805, the central server 200 accesses task database 240 and identifies a remote monitoring task for assignment to the user. This includes determining an appropriate task identifier (e.g., "12345") and shift (e.g., Jan. 1, 1998 and/or 12:00 AM–3:00 AM). In an alternate embodiment, the user is not assigned a shift. Rather, the user can log on for assignment of a remote monitoring task at any time and end the remote monitoring session (i.e., log off) at any time. As a precondition to logging off without negatively impacting the user's rating, sever 200 may require that an alternate user be available to continue monitoring the remote location. (As discussed in detail below, the present invention can notify a back-up user to replace an original user.)

The process of identifying a remote monitoring task may take into account the predetermined rules in field 530 of task database 240 specified by the location owner (e.g., a minimum user rating required for a user to be assigned a particular location). The process may also take into account user-specified preferences concerning the assigned shift. In addition, the process preferably includes taking precautions to maintain anonymity of the location being monitored. Without such precautions, an unscrupulous user knowing the location's identity could study the location's characteristics, such as its traffic patterns, to plan a crime. For example, central server 200 may prevent the user from monitoring a location that is within a predetermined distance from the user's physical location (as determined by reference to zip codes or modern navigation methods such as GPS). Alternatively, central server 200 may prevent the user from monitoring the location more than a predetermined total number of times, or from monitoring the location during a predetermined time of day if the user has previously monitored the location a predetermined number of times during that time of day. In yet another embodiment, central server 200 may randomly change the user's assigned location during the user's shift. In summary, it is desirable that central server 200 not provide the user with the identity of the remote location to be monitored and take affirmative steps to prevent the user from ascertaining the identity of the location.

Once a task identifier and shift has been assigned to the user, central server 200 communicates them to the user together with the emergency procedure specified in field 540 of task database 240 for reporting emergencies at the remote location. In step 810, the central server 200 establishes a record for the user in session status database 245. Rather than creating a new record for the user, the user identifier may be added to a previously established record. For example, a location may be monitored by a plurality of users and at least one user of the plurality of users may have already been assigned the location and thus a corresponding record may have already been established in session status database 245. The record in session status database 245 includes the task identifier in field 605, the shift in field 610 and the user identifier in field 615. The status in field 620 and the performance results in field 625 may contain a "Not Available" entry or the like, until commencement of the remote monitoring session.

It is to be understood that often it may be impractical for the user to remain in communication with central server 200 until the start time of the shift (e.g., the user may be logged on in the early morning and the assigned shift does not begin until mid-afternoon). In such instances, the user may log off after receiving the task identifier and shift, and then log on to central server 200 at a time closer to the start of the shift. When logging back on, the user preferably provides the user identifier, task identifier and shift to assist central server 200 in identifying which remote monitoring task in session status database 245 the user is logging on to perform (e.g., the user may be assigned more than one remote monitoring task). Central server 200 may also transmit a reminder to the user via e-mail or telephonically (i.e., a voice call) prior to the start of the shift.

At a predetermined period of time prior to the start of the shift, central server 200 in step 815 determines whether the rules in field 530 of task database 240 corresponding to the task identifier and shift assigned to the user have been satisfied. For example, the rules may require a minimum number of users (and/or users of a particular rating) for the remote monitoring task to commence. Moreover, the number of assigned users and/or the user ratings of those users may have changed since the user was initially assigned the task identifier and shift requiring a re-evaluation in light of the rules in field 530 of database 240. If the rules in field 530 have been satisfied then in step 820 central server 200 uses the sensor address in field 515 of task database 240 to enable communication between the location sensor device(s) and the user device at the start of the shift. Central server 200 also updates the status in field 620 of the appropriate record in session status database 245 from "Not Available" to "In Progress". It is to be understood that the communication between the location sensor devices and the user devices can be video-based and/or audio-based. If only audio-based, a "speakerphone" setting on the user device is used to monitor sounds at the remote location.

As previously described, a location may be monitored in accordance with the present invention by a plurality of users simultaneously. In such instances, the present invention can deter "bystander inaction syndrome". Bystander inaction syndrome is a sociological behavioral pattern that emerges when several people simultaneously witness an emergency, but each person assumes that someone else will notify the authorities. The present invention prevents this behavioral pattern in several ways. In one embodiment, central server 200 simply does not inform the user that anyone else is monitoring the location. In another embodiment, central server 200 informs the user that he is the only user monitoring the remote location. In either case, the user is instilled with the belief that if he does not report the emergency, it will not be reported at all. In an alternate embodiment, central server 200 informs the user whenever an emergency is reported by another user at the location the user is monitoring. In this manner, when an emergency occurs, the user knows whether anyone else has reported it yet and can act accordingly. In some of the embodiments discussed hereinafter, central server 200 imposes penalties for false positives or inattentiveness and/or pays bonuses for the detection of legitimate emergencies. Thus, in those embodiments, users are economically motivated to report legitimate emergencies.

Continuing with FIG. 8A, central server 200 in step 825 uses the task identifier to access the corresponding record in the user performance testing rules database 250. At the test communication intervals specified in field 715, central server 200 transmits the test communication specified in field 710 of the record to the user device to measure user attentiveness. In a first embodiment, the test communication comprises a randomly transmitted predetermined video of a fabricated emergency. In a second embodiment, the test communication comprises one or more questions communicated to the user, for example, by e-mail.

In an alternate embodiment, central server 200 monitors a biometric reading from the user at the remote device to measure user attentiveness. For example, the user device may be equipped with a retinal scanner similar to those being developed for ATM machines. The retinal scanner would then take random, periodic or continuous readings to determine whether the user is watching the video stream from the remote location on his screen. In yet another alternate embodiment, the user device is equipped with a video camera. Other users can then log on to central server 200 and be assigned the remote monitoring task of monitoring another user monitoring a remote location. Once inattention is detected, central server 200 may also enforce attention by causing an audible alarm to be transmitted to the user. The alarm may grow progressively louder until the user responds to the alarm.

Whereas the foregoing embodiments function to detect and deter inattention, other embodiments function to encourage attentiveness. In one embodiment, for example, central server 200 randomly transmits to the user an offer to enter the user in a sweepstakes. In another embodiment, entertainment video is transmitted to the user at random times and/or for random durations. Since the user cannot predict when the next transmission of entertainment video will occur, he will be encouraged to remain attentive to await the next transmission.

In step 830 of FIG. 8A, central server 200 determines whether a response to the test communication was received within the response time specified in field 720. If a predetermined number of responses (which may be recorded in RAM 215 for the duration of the shift) are not received within the time specified in field 720, then in step 835 central server 200 penalizes the user by adjusting the user's rating in user database 230 in accordance with predetermined criteria, and thereafter disables communications between the location sensor device(s) and the user device. In addition to adjusting the user's rating, central server 200 may penalize the user by not paying him for the remote monitoring session, paying him less than the pay rate specified in field 525 of task database 240, imposing a charge upon the user (i.e., deducting a predetermined amount from the account balance in field 430 of user database 230), and, in an extreme case, preventing the user from participating in remote monitoring tasks in the future. In one embodiment, if central server 200 determines that the user is inattentive, a back-up user can be notified to replace the original user. The back-up user can then log-on and monitor the location for the remainder of the original user's shift. Such an embodiment is particularly well suited to situations in which the operator of central server 200 is an ISP, since the ISP can actively monitor all current users that utilize the ISP for Internet related services. Thus, the ISP can recruit users to perform remote monitoring tasks for value (e.g., by transmitting offers to registered users of the ISP).

If a response was received within the specified time, central server 200, in step 840 of FIG. 8B, evaluates the response to determine whether it was the response specified in field 725 of the user performance testing rules database 250 (e.g., click 911). If the test communication transmitted to the user comprises a question, the evaluation in step 840 includes determining whether the user responded with the expected answer. In step 845, central server 200 updates the user's rating in database 230 in accordance with predetermined criteria and, if the user's shift is not over (step 850), the process returns to step 825. As discussed above, the ratings can be used when determining whether to assign a user a particular remote monitoring task and it is envisioned that users with higher ratings will be assigned higher paying tasks (e.g., a bank may be willing to pay more than a homeowner to have a location remotely monitored). At the end of the shift, in step 850, the central server 200 uses the task identifier to access the corresponding record in the session status database 245 and update the entry in field 625 ("Performance Results") to reflect the user's performance in responding to test communications. Alternatively, the user's performance may be continuously or periodically updated during the shift.

Finally, in step 855, central server 200 credits the user's account balance in field 430 of user database 230 in accordance with the pay rate and shift duration specified in fields 525 and 535 respectively of task database 240. Various payment schemes are contemplated. For example, the pay rate may incorporate such criteria as the time of day (e.g., a user may be paid more to monitor a location between the early morning hours of 2:00 AM and 5:00 AM), whether the user is monitoring two or more locations simultaneously (e.g., a user may be paid more to monitor two or more locations at the same time), the criminal history of the community in which the sensor is located (e.g., a user may be paid more to monitor locations whose zip codes correspond to communities having statistically higher crime rates or, alternatively, more users may be assigned to higher crime areas), and/or the number of users simultaneously monitoring the remote location (e.g., the user may be paid less if more than one user is monitoring the same location). If the operator of central server 200 is an ISP, the user may be provided with discounted or free Internet access if the user monitors the location for a predetermined amount of time during the billing cycle. The ISP may also submit sweepstakes entries or other positive rewards on the user's behalf for each predetermined period of time spent monitoring a location (e.g., one entry for each x minutes spent monitoring). Those skilled in the art will appreciate that many types of services may be granted to the user in exchange for performing remote monitoring tasks. In addition, bonuses may be paid for each legitimate emergency detected by the user.

In an alternate embodiment, the user operates a different program (e.g., a word processor) in a different window on the user device 300a–c while maintaining communication with the sensor device(s) 100a–c via central server 200 using a web browser. In this embodiment, the sensor device includes a video camera and a motion detector. Rather than, or in addition to, detecting motion at the remote location, the sensor device may be equipped to detect other events such as a predetermined level of light intensity (e.g., a bright light illuminating a dark area) or static (e.g., resulting from the sensor having been disabled). In response to a signal from the central server indicative of a predetermined event having been detected by a sensor device, the user device preempts the program being operated by the user to immediately display the video data received from the video camera. The user can then review the displayed video data to determine whether an emergency has occurred at the remote location. Thus, in accordance with one aspect of the present invention, a user can receive value for passively monitoring a remote location while working on an entirely different project.

In yet an alternate embodiment, rather than enabling communication between sensor devices 100a–c and user devices 300a–c via the Internet, central server 200 causes the video/audio data stream received from sensor devices 100a–c to be transmitted to user devices 300a–c via a dedicated television channel of a wireless or cable television system. The user can then monitor the video/audio data on the user device, which, in this embodiment, is preferably a television set. In addition, if the user device includes a picture-in-picture feature, the user can employ this feature to monitor the video data while watching a program on another television station. In these embodiments, a user can submit a request to monitor a remote location via an interactive television set or, via his telephone by calling the operator of central server 200, if this television does not include an interactive feature. In an alternate embodiment, in addition to a video camera, the sensor device(s) 100a–c include detectors for detecting predetermined events (e.g., a predetermined level of motion, sound, light intensity, etc.) at the remote location. When a predetermined event is detected by the sensor device, a signal indicative of the predetermined event is transmitted from the central server to functionality in the television set via the wireless or cable television system. In response to the received signal, the functionality in the television set preempts the television program currently being watched by the user to display the video/audio data received from the video camera (e.g., the television will change channels to the dedicated television channel). Alternatively, the functionality in the television set may simply display a visual alert to the user to manually change channels to the dedicated television channel. In these embodiments, functionality in the television set may also cause an audible alarm to be issued to inform the user that a predetermined event has been detected at the remote sensor. Thus, the user may engage in other activities, such as household chores, while monitoring a remote location in exchange for value.

Figure 9:
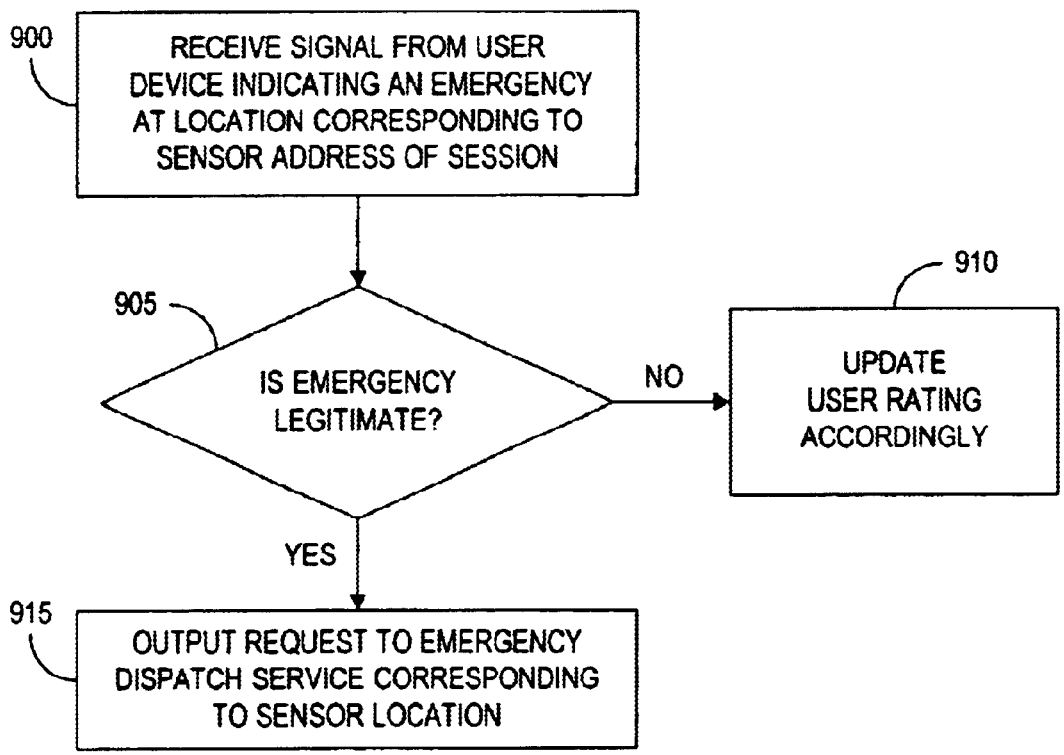
FIG. 9 is a flow chart illustrating an exemplary emergency procedure executed by the central server of the present invention.

FIG. 9 is a flow chart illustrating an exemplary emergency procedure executed by the central server 200 of the present invention. In step 900, central server 200 receives a signal from the user device indicating an emergency at the remote location corresponding to the sensor address of the current monitoring session. In step 905, central server 200 determines whether the reported emergency is in response to a test communication and, if not, whether the reported emergency is legitimate. In one embodiment, if the reported emergency is not in response to a test communication, central server 200 will immediately communicate the video feed of the remote location to other users who will verify that an emergency has occurred. In a second embodiment, central server 200 will contact an emergency dispatch service only if a threshold number or percentage of users have reported the emergency. If the emergency is not legitimate, central server 200, in step 910, lowers the user's rating in user database 230 in accordance with predetermined criteria. If, however, the reported emergency is legitimate, central server 200, in step 915, transmits an output request to an emergency dispatch service corresponding to the sensor location in field 510 of task database 240. Alternatively, central server 200 communicates to the user the phone number of the emergency dispatch service corresponding to the geographic location of the sensor. Upon detecting an emergency, the user contacts the emergency dispatch service himself.

The many features and advantages of the present invention are apparent from the detailed specification, and thus, it is intended by the appended claims to cover all such features and advantages of the invention which fall within the true spirit and scope of the present invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

We claim:

1. A method for monitoring a remote location, comprising:

obtaining at a server from a sensor located at a remote location, an image of the remote location;

providing the image to a remote viewer of a viewer device;

determining a response of the remote viewer to the image;

determining, based on the response, a status of the remote location,
wherein the status of the remote location is determined to be
a first status if the response is a first response, and
a second status if the response is a second response.

2. The method of claim 1, further comprising:

initiating an action if the status is determined to be the first status.

3. The method of claim 2, wherein the step of initiating comprises:

notifying a predetermined person of the status.

4. The method of claim 3, wherein the step of notifying comprises:

notifying a person charged with ensuring the security of the remote location of the status.

5. The method of claim 2, wherein the step of initiating comprises:

providing the image to at least one other viewer of another viewer device.

6. The method of claim 1, further comprising:

causing a payment to be provided to the remote viewer of the viewer device.

7. The method of claim 6, wherein the step of causing comprises:

causing a payment to be provided to the remote viewer, wherein the payment is in exchange for time the remote viewer spent viewing at least the image.

8. The method of claim 1, wherein the step of determining the status of the remote location to be a first status if the response is a first response comprises:

determining that the security of the remote location has potentially been impaired if the response is a first response.

9. The method of claim 1, wherein the response is received at the server and in response to a query provided to the remote viewer.

10. The method of claim 1, wherein the query comprises a query of whether the remote viewer perceives in the image an apparent impairment in the security of the remote location.

11. An apparatus comprising:

a processor, and a storage device that stores a program for directing the processor;

the processor being operative with the program to:
perform the method of claim 1.

12. A computer readable medium encoded with instructions for directing a processor to:

perform the method of claim 1.

13. A method for monitoring a remote location, comprising:

receiving, at a server from a user of a remote user device, a response to data descriptive of a remote location that was provided to the user;

determining, by the server, a status of the remote location based on the response, wherein the status is determined to be a first status if the response is a first response, a second status if the response is a second response; and initiating a predetermined action if the status is determined to be a first status.

14. The method of claim 13, wherein the data descriptive of the remote location comprises an image of the remote location.

15. The method of claim 13, wherein the data had been provided to the user by the server.

16. The method of claim 13, wherein the data had been provided to the user by a computing device other than the server at which the response is received.

17. The method of claim 13, wherein the step of determining the status of the remote location comprises:

determining, by the server and based on the response, whether the security of the remote location has potentially been impaired, wherein it is determined that the security of the remote location has potentially been impaired if the response is a first response, and the security of the remote location has not been impaired if the response is a second response.

18. The method of claim 13, wherein the step of initiating comprises:

notifying a predetermined person of the first status.

19. The method of claim 18, wherein the step of initiating comprises:

notifying a person charged with ensuring the security of the remote location of the first status.

20. The method of claim 13, wherein the step of initiating comprises:

transmitting an alarm signal to a predetermined computing device.

21. The method of claim 13, further comprising:

causing a payment to be provided to the user in exchange for the user viewing the image.

22. An apparatus, comprising:

a processor, and a storage device that stores a program for directing the processor;

the processor being operative with the program to:

perform the method of claim 13.

23. A computer readable medium encoded with instructions for directing a processor to:

perform the method of claim 13.

24. A method for monitoring the security of a remote location, comprising:

obtaining, at a server from a sensor at a remote location, a first image of the remote location;

forwarding the image to a first viewer of a first viewer device;

querying the first viewer to determine whether the first viewer perceives in the first image an apparent impairment of the security of the remote location;

receiving a response to the query from the first viewer;

determining that the security of the remote location has apparently been impaired if the response indicates that the first viewer does perceive an apparent impairment of the security of the remote location; and initiating a predetermined action if the response indicates that the first viewer does perceive an apparent impairment of the security of the remote location.

25. The method of claim 24, wherein the step of querying comprises:

querying the first viewer to determine whether the first viewer perceives an image of a person accessing the remote location.

26. The method of claim 24, wherein the step of querying comprises:

querying the first viewer to determine whether the first viewer perceives an image of a person attempting to access the remote location.

27. The method of claim 24, wherein the step of querying comprises:

querying the first viewer to determine whether the first viewer perceives an image of a person present at the remote location.

28. The method of claim 24, wherein the step of querying comprises:

querying the first viewer to determine whether the first viewer perceives an image of a vehicle at the remote location.

29. The method of claim 24, wherein the step of initiating an action comprises:

notifying a predetermined person that the first viewer does perceive an apparent impairment of the security of the remote location.

30. The method of claim 29, wherein the step of notifying comprises:

notifying a person charged with ensuring the security of the remote location that the first viewer does perceive an apparent impairment of the security of the remote location.

31. The method of claims 29, wherein the step of notifying comprises:

transmitting an alarm to a computing device of the predetermined person.

32. The method of claim 24, wherein the step of initiating an action comprises:

forwarding the first image to a second viewer of a second viewer device; and querying the second viewer to determine whether the second viewer perceives in the first image an apparent impairment of the security of the remote location.

33. The method of claim 32, further comprising:

notifying a predetermined person if a response to the query of the second viewer indicates that the second viewer does perceive in the first image an apparent impairment of the security of the remote location.

34. The method of claim 32, further comprising:

transmitting an alarm from the server to a predetermined computing device if a response to the query of the second viewer indicates that the second viewer does perceive in the first image an apparent impairment of the security of the remote location.

35. The method of claim 24, wherein the step of initiating an action comprises:

obtaining, at the server from the sensor at the remote location, a second image of the remote location.

36. The method of claim 35, wherein the step of initiating an action further comprises:

forwarding the second image to the first viewer of the first viewer device; and querying the first viewer to determine whether the first viewer perceives in the second image an apparent impairment of the security of the remote location.

37. The method of claim 35, wherein the step of initiating an action further comprises:

forwarding the second image to a second viewer of a second viewer device; and querying the second viewer to determine whether the second viewer perceives in the second image an apparent impairment of the security of the remote location.

38. The method of claim 37, further comprising:

notifying a predetermined person if a response to the query of the second viewer indicates that the second viewer does perceive in the second image an apparent impairment of the security of the remote location.

39. The method of claim 37, further comprising:

transmitting an alarm, from the server to a predetermined computing device, if a response to the query of the second viewer indicates that the second viewer does perceive in the second image an apparent impairment of the security of the remote location.

40. The method of claim 24, wherein the step of querying comprises:

querying the first viewer to determine whether the first viewer perceives in the first image at least one of an apparently unauthorized person and an apparently unauthorized vehicle present at the remote location.

41. The method of claim 24, wherein the step of querying comprises:

querying the first viewer to determine whether the first viewer perceives in the first image at least one of an apparently unauthorized person and an apparently unauthorized vehicle attempting to access the remote location.

42. The method of claim 24, further comprising:

providing to the first viewer a payment in exchange for the first viewer's viewing of the first image.

43. An apparatus, comprising:

a processor, and a storage device that stores a program for directing the processor;

the processor being operative with the program to:

perform the method of claim 24.

44. A computer readable medium encoded with instructions for directing a processor to:

perform the method of claim 24.

* * * * *

US006720990C1

(12) EX PARTE REEXAMINATION CERTIFICATE (10351st)

United States Patent
Walker et al.

(10) Number: US 6,720,990 C1
(45) Certificate Issued: Oct. 22, 2014

(54) INTERNET SURVEILLANCE SYSTEM AND METHOD

(75) Inventors: Jay S. Walker, Ridgefield, CT (US); Daniel E. Tedesco, New Canaan, CT (US); Dean P. Alderucci, Ridgefield, CT (US); Magdalena Mik, Greenwich, CT (US)

(73) Assignee: Walker Digital, LLC, Stamford, CT (US)

Reexamination Request:
No. 90/020,001, May 15, 2012

Reexamination Certificate for:
Patent No.: 6,720,990
Issued: Apr. 13, 2004
Appl. No.: 09/221,250
Filed: Dec. 28, 1998

(51) Int. Cl.
*H04N 7/18* (2006.01)

(52) U.S. Cl.
USPC ............ 348/143; 348/153; 348/154; 725/105

(58) Field of Classification Search
None
See application file for complete search history.

(56) References Cited

To view the complete listing of prior art documents cited during the proceeding for Reexamination Control Number 90/020,001, please refer to the USPTO's public Patent Application Information Retrieval (PAIR) system under the Display References tab.

*Primary Examiner* — Rachna Desai

(57) ABSTRACT

A system and method are disclosed for a central server to manage remote monitoring tasks performed by users of a data network. An exemplary method comprises: receiving a request from a user of a user device to monitor a remote location; determining a remote location to be monitored; enabling communication between a sensor at the remote location and the user device; and crediting value to the user in accordance with an amount of time the user device has been in communication with the remote sensor for remote monitoring purposes. An alternate exemplary method includes measuring user attentiveness while the user device is in communication with the remote sensor. Thus, the disclosed system and method provide a way for users of a data network such as the Internet to log on at any time and perform remote monitoring tasks for value. Idle time can now be turned into value using the disclosed system and method. Moreover, little or no skill is required of the user to earn value using the disclosed system and method; the user need only be attentive while performing a remote monitoring task. Location owners also benefit from the convenience by which they can now have their properties monitored and by the ability of the disclosed system and method to ensure the attentiveness of the user performing the remote monitoring task.

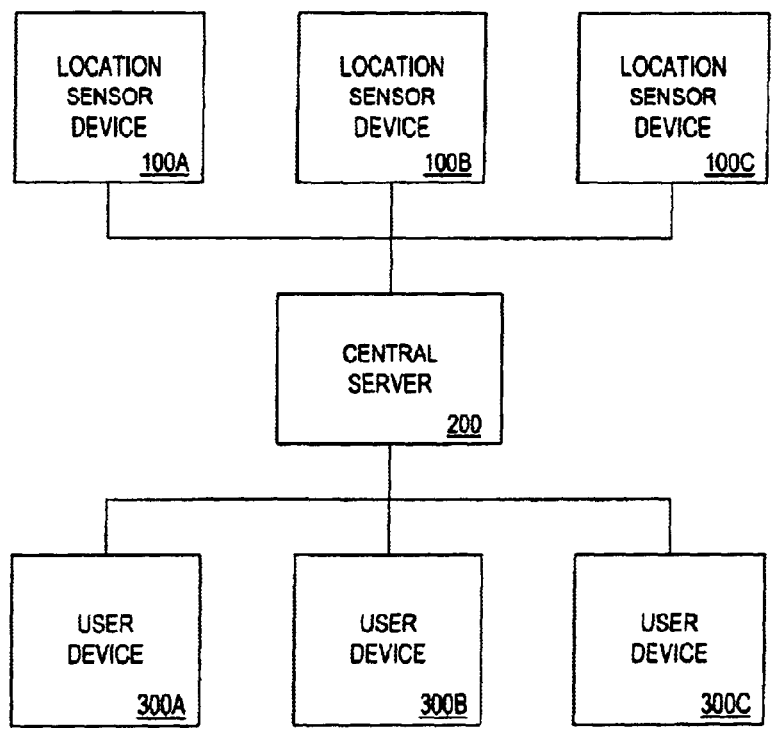

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-44 are cancelled.

\* \* \* \* \*